Patented July 11, 1933

1,917,754

UNITED STATES PATENT OFFICE

ELMER RALPH DE ONG, OF BERKELEY, CALIFORNIA, ASSIGNOR TO SHELL DEVELOPMENT COMPANY, OF SAN FRANCISCO, CALIFORNIA, A CORPORATION OF DELAWARE

INSECTICIDE

No Drawing.   Application filed August 23, 1929.   Serial No. 388,038.

My invention provides a new insecticide consisting of the so called "Edeleanu-Extract."

"Edeleanu-extract" is the extract resulting from the "Edeleanu process", the extracting of kerosene or other petroleum distillates with liquid sulfur dioxide to obtain a kerosene, or burning oil consisting nearly exclusively of paraffin and naphthene hydrocarbons, which will not smoke or soot on burning. The "Edeleanu process" is fully described in U. S. Patent 911,553 to Lazar Edeleanu, which also defines the "extract" as herein mentioned. Paraffin and naphthene hydrocarbons are not soluble in liquid sulfur dioxide at around minus 10° C. while most other components of the distillate are soluble at such temperatures. The distillate is cooled usually below 0° C., but not colder than minus 10° and mixed with the liquid sulfur dioxide in around equal proportions by weight, the exact proportions depending on the nature of the oil undergoing treatment; on standing a clear separation takes place between purified distillate and liquid sulfur dioxide, the latter containing the dissolved impurities; after removal of the purified distillate most of the sulfur dioxide is distilled off from the extract, comprising such impurities and used again; the extract, substantally sulfur dioxide free, is removed to storage; it has, at present, little commercial value.

The treatment is usually applied to oils of the kerosene fraction, but lighter and heavier oils, distillates and residues from petroleum may be similarly treated with liquid sulfur dioxide, and such extracts will have similar properties as insecticides.

I have found that this extract is not only very toxic for all forms of insect life, but also for most plants; its use is, therefore, limited to cases where there is no danger of harming useful plants.

I have used it with great success to combat such forms of insect life as the pupæ of flies, moths, beetles, Argentine ants, fruitflies, insect-like-animals and worms; particularly where these are found in soil, not planted with useful plants, also where plants are dying or where they have to be killed.

One instance of its use is against the artichoke borer, which remains on the soil in the tops that have been cut off and will be plowed under; if the borers are not killed before the tops are buried, they will remain in the field and show up again the following season. In some cases the extract can also be used on dormant plants, but this involves the risk of injury to the plants, therefore this necessitates great care.

The pure form of the extract can be applied, but preferably I spray it in the form of an emulsion in water, the strength of which depends on the purpose; 60% of extract in water is a very effective mixture with which to kill insects in open soil. The most convenient method of application is to spray in a mist, under a pressure of, say, 100 pounds. If used in the soil, the extract must be sufficiently volatile to leave no injurious residue after its use. For use on dormant plants it is better to incorporate only a very small portion of the extract in any highly refined well known plant spray oil, which itself is not very toxic to plants.

The extract contains sufficient volatile fractions, that if desired it may be used as a fumigant; in full sunlight its vapors are strong enough to effectively kill many kinds of insects; if necessary evaporation may be aided by artificial heat. With this method of application there is less danger of injury to the plants, and it can be used in many cases where the use of the liquid extract would be out of the question, as on citrus trees. The extract may also be used as a fumigant for the control of insects attacking foodstuffs or other stored products, particularly in closed spaces, and if desired under heating to aid evaporation.

Further, I have found that the toxicity of this liquid-sulfur dioxide extract can be increased and its effect on insects strengthened considerably by oxidation. Preferably, I oxidize the extract by spraying it in a fine mist through air, but other methods well known in the art may also be used, as for instance, the blowing of air through the liquid. This oxidized extract is applied to the insects or soil in the same manner as mentioned above.

I have also found that in concentration too low to be toxic, this extract acts as a repellant, and can be effectively used as such in cases where it is sufficient protection for the plants, if the insects are kept away, without killing them. This repelling action is probably the effect of its odor. The repellant action is independent from the toxic action; substances which are toxic, might not be repellants, and repellants are not always toxic in higher concentrations. When using the extract as a repellant, the concentration will have to vary according to the kind of insects, of plants, the season etc; in general the concentration will be much lower than when using the extract as insecticide. Generally 25% of the extract in water will be sufficient. It can be applied as a repellant either with liquid sprays, or together with dust applications.

It will be understood that the appended claims are to be accorded the scope and range of equivalents consistent with the state of the prior art.

I claim as my invention:

1. A new insecticidal and/or insect-repelling composition of matter containing as its active ingredient a substantial quantity of Edeleanu extract.

2. A new insecticidal and/or insect-repelling composition of matter containing as its active ingredient a substantial quantity of Edeleanu extract derived from a kerosene distillate.

3. A new insecticidal and/or insect-repelling composition of matter containing as its active ingredient a substantial quantity of the oxidized Edeleanu extract.

4. A new insecticidal and/or insect-repelling composition of matter containing as its active ingredient a substantial quantity of the oxidized Edeleanu extract derived from a kerosene distillate.

5. A new insecticidal aqueous emulsion containing as its active ingredient at least 60% Edeleanu extract.

6. A new insect-repelling aqueous emulsion containing as its active ingredient at least 25% Edeleanu extract.

7. A new insecticidal aqueous emulsion containing as its active ingredient at least 60% of the oxidized Edeleanu extract.

8. A new insect-repelling aqueous emulsion containing as its active ingredient at least 25% of the oxidized Edeleanu extract.

In testimony whereof, I have hereunto set my hand this 15th day of August, 1929.

E. RALPH DE ONG.

DISCLAIMER 1,917,754.—*Elmer Ralph De Ong*, Berkeley, Calif. INSECTICIDE. Patent dated July 11, 1933. Disclaimer filed September 3, 1935, by the assignee, *Shell Development Company*.

Hereby enters this disclaimer to that part of the specification and claims which describes the use of unaltered Edeleanu extract of a hydrocarbon oil as an active ingredient in insecticidal and/or insect-repelling compositions, and particularly to the following claims:

"1. A new insecticidal and/or insect-repelling composition of matter containing as its active ingredient a substantial quantity of Edeleanu extract.

"2. A new insecticidal and/or insect-repelling composition of matter containing as its active ingredient a substantial quantity of Edeleanu extract derived from a kerosene distillate."

"5. A new insecticidal aqueous emulsion containing as its active ingredient at least 60% Edeleanu extract.

"6. A new insect-repelling aqueous emulsion containing as its active ingredient at least 25% Edeleanu extract."

[*Official Gazette September 24, 1935.*]

the insects or soil in the same manner as mentioned above.

I have also found that in concentration too low to be toxic, this extract acts as a repellant, and can be effectively used as such in cases where it is sufficient protection for the plants, if the insects are kept away, without killing them. This repelling action is probably the effect of its odor. The repellant action is independent from the toxic action; substances which are toxic, might not be repellants, and repellants are not always toxic in higher concentrations. When using the extract as a repellant, the concentration will have to vary according to the kind of insects, of plants, the season etc; in general the concentration will be much lower than when using the extract as insecticide. Generally 25% of the extract in water will be sufficient. It can be applied as a repellant either with liquid sprays, or together with dust applications.

It will be understood that the appended claims are to be accorded the scope and range of equivalents consistent with the state of the prior art.

I claim as my invention:

1. A new insecticidal and/or insect-repelling composition of matter containing as its active ingredient a substantial quantity of Edeleanu extract.

2. A new insecticidal and/or insect-repelling composition of matter containing as its active ingredient a substantial quantity of Edeleanu extract derived from a kerosene distillate.

3. A new insecticidal and/or insect-repelling composition of matter containing as its active ingredient a substantial quantity of the oxidized Edeleanu extract.

4. A new insecticidal and/or insect-repelling composition of matter containing as its active ingredient a substantial quantity of the oxidized Edeleanu extract derived from a kerosene distillate.

5. A new insecticidal aqueous emulsion containing as its active ingredient at least 60% Edeleanu extract.

6. A new insect-repelling aqueous emulsion containing as its active ingredient at least 25% Edeleanu extract.

7. A new insecticidal aqueous emulsion containing as its active ingredient at least 60% of the oxidized Edeleanu extract.

8. A new insect-repelling aqueous emulsion containing as its active ingredient at least 25% of the oxidized Edeleanu extract.

In testimony whereof, I have hereunto set my hand this 15th day of August, 1929.

E. RALPH DE ONG.

DISCLAIMER 1,917,754.—*Elmer Ralph De Ong*, Berkeley, Calif. INSECTICIDE. Patent dated July 11, 1933. Disclaimer filed September 3, 1935, by the assignee, *Shell Development Company*.

Hereby enters this disclaimer to that part of the specification and claims which describes the use of unaltered Edeleanu extract of a hydrocarbon oil as an active ingredient in insecticidal and/or insect-repelling compositions, and particularly to the following claims:

"1. A new insecticidal and/or insect-repelling composition of matter containing as its active ingredient a substantial quantity of Edeleanu extract.

"2. A new insecticidal and/or insect-repelling composition of matter containing as its active ingredient a substantial quantity of Edeleanu extract derived from a kerosene distillate."

"5. A new insecticidal aqueous emulsion containing as its active ingredient at least 60% Edeleanu extract.

"6. A new insect-repelling aqueous emulsion containing as its active ingredient at least 25% Edeleanu extract."

[*Official Gazette September 24, 1935.*]

DISCLAIMER 1,917,754.—*Elmer Ralph De Ong*, Berkeley, Calif. INSECTICIDE. Patent dated July 11, 1933. Disclaimer filed September 3, 1935, by the assignee, *Shell Development Company*.

Hereby enters this disclaimer to that part of the specification and claims which describes the use of unaltered Edeleanu extract of a hydrocarbon oil as an active ingredient in insecticidal and/or insect-repelling compositions, and particularly to the following claims:

"1. A new insecticidal and/or insect-repelling composition of matter containing as its active ingredient a substantial quantity of Edeleanu extract.

"2. A new insecticidal and/or insect-repelling composition of matter containing as its active ingredient a substantial quantity of Edeleanu extract derived from a kerosene distillate."

"5. A new insecticidal aqueous emulsion containing as its active ingredient at least 60% Edeleanu extract.

"6. A new insect-repelling aqueous emulsion containing as its active ingredient at least 25% Edeleanu extract."

[*Official Gazette September 24, 1935.*]